(12) United States Patent
Garg et al.

(10) Patent No.: US 11,151,850 B2
(45) Date of Patent: *Oct. 19, 2021

(54) PRESENCE DETECTION BASED ON SIGNAL DATA

(71) Applicant: Transform SR Brands LLC, Hoffman Estates, IL (US)

(72) Inventors: Parag Kumar Garg, Woodinville, WA (US); Nicholas Frank LaVassar, Issaquah, WA (US); Joseph Reid Baird, Sammamich, WA (US); Donald Smyth, Seattle, WA (US); Jonathan Kevin Gagliardoni, Seattle, WA (US); Daniel Sihe Kuang Lee, Seattle, WA (US)

(73) Assignee: Transform SR Brands LLC, Hoffman Estates, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/787,095

(22) Filed: Feb. 11, 2020

(65) Prior Publication Data

US 2020/0175831 A1 Jun. 4, 2020

Related U.S. Application Data

(63) Continuation of application No. 15/665,308, filed on Jul. 31, 2017.

(51) Int. Cl.
*G08B 13/24* (2006.01)
*H04B 17/318* (2015.01)
*G08B 21/04* (2006.01)

(52) U.S. Cl.
CPC .......... *G08B 13/24* (2013.01); *G08B 13/2491* (2013.01); *G08B 21/0415* (2013.01); *H04B 17/318* (2015.01)

(58) Field of Classification Search
CPC ...... G08B 13/00; G08B 13/08; G08B 13/124; G08B 13/1436; G08B 13/16;
(Continued)

(56) References Cited

U.S. PATENT DOCUMENTS

2005/0055568 A1* 3/2005 Agrawala ................ G07C 9/28
726/2
2011/0063110 A1* 3/2011 Habib ................ G08B 13/2491
340/552

(Continued)

OTHER PUBLICATIONS

Int'l Search Report and Written Opinion Appln No. PCT/US2018/044522 dated Sep. 10, 2018 (13 pgs).

*Primary Examiner* — Brian Wilson
(74) *Attorney, Agent, or Firm* — McAndrews, Held & Malloy, Ltd.

(57) ABSTRACT

Techniques for providing status information of a defined location are described. Data indicative of signal strength associated with radio frequency (RF) signals received by one or more devices communicating via a wireless communications protocol is accessed. A baseline signal strength profile based on the data is determined. The data indicative of signal strength associated with RF signals received by the one or more devices is monitored. Based on a comparison of the monitored data to the baseline signal strength profile, a presence of at least one person in a vicinity of the one or more devices is determined. At least one action based on the determined presence is initiated.

20 Claims, 12 Drawing Sheets

(58) Field of Classification Search
CPC .. G08B 13/1618; G08B 13/18; G08B 13/187;
G08B 13/189; G08B 13/24; G08B
13/2491; G08B 13/26; G08B 21/0415;
H04B 17/318
USPC ........ 340/551, 552, 553, 554, 561, 565, 567
See application file for complete search history.

(56) References Cited

U.S. PATENT DOCUMENTS

| | | | |
|---|---|---|---|
| 2012/0146788 A1 | 6/2012 | Wilson | |
| 2012/0300067 A1* | 11/2012 | Naqvi | G01V 3/12 |
| | | | 348/143 |
| 2014/0375454 A1* | 12/2014 | Konrad | G08B 13/24 |
| | | | 340/552 |
| 2015/0334569 A1* | 11/2015 | Rangarajan | H04W 12/1202 |
| | | | 726/4 |
| 2016/0284186 A1* | 9/2016 | Pavlich | G08B 13/00 |
| 2017/0078845 A1* | 3/2017 | Wootton | H04W 4/80 |

* cited by examiner

PRESENCE DETECTION BASED ON SIGNAL DATA

The present application is a continuation of U.S. application Ser. No. 15/665,308 filed Jul. 31, 2017.

BACKGROUND

Homes, buildings, and other physical locations typically have one or more wireless electronic devices. Such devices may operate alone or may communicate on a wireless network such as an IoT network. Various devices or equipment may be embedded with electronics, sensors, software and network connectivity and that are able to send data and collect and exchange information with one another. Such devices typically emit radio frequency (RF) signals.

SUMMARY

Methods and systems for determining status information of an environment are disclosed. Data indicative of signal strength associated with radio frequency (RF) signals received by one or more devices communicating via a wireless communications protocol is accessed. A baseline signal strength profile based on the data is determined. The data indicative of signal strength associated with RF signals received by the one or more devices is monitored. Based on a comparison of the monitored data to the baseline signal strength profile, a presence of at least one person in a vicinity of the one or more devices is determined. At least one action based on the determined presence is initiated.

The features, functions, and advantages can be achieved independently in various embodiments or may be combined in yet other embodiments, further details of which can be seen with reference to the following description and illustrations.

DETAILED DESCRIPTION

This disclosure describes techniques and systems for determining the physical presence or absence of one or more persons in a given physical space based on changes to the radio frequency (RF) environment associated with the physical space. Based on the physical presence determination, one or more actions may be initiated based on the presence or absence determination. For example, various systems or functions may be enabled or disabled, or notifications may be transmitted to one or more recipients.

The described techniques and systems may be implemented in the context of an interconnected network, such as an Internet of Things (IoT) network that may be coupled to computing devices as well as sensors and other devices located throughout a home, office, or other environment. The devices may include RF transmission/reception functionality that emits RF signals when communicating on the interconnected network. Additionally, other devices operating on other networks or operating in a standalone mode may also emit RF signals. Based on some or all of the RF signals emitted by the various devices in a given environment, an RF signature may be defined. Changes to the RF signature may be analyzed and inferences may be made based on the changes. This disclosure describes techniques for determining if one or more persons are present in a given environment, and using that determination to initiate one or more actions.

Figure 1:
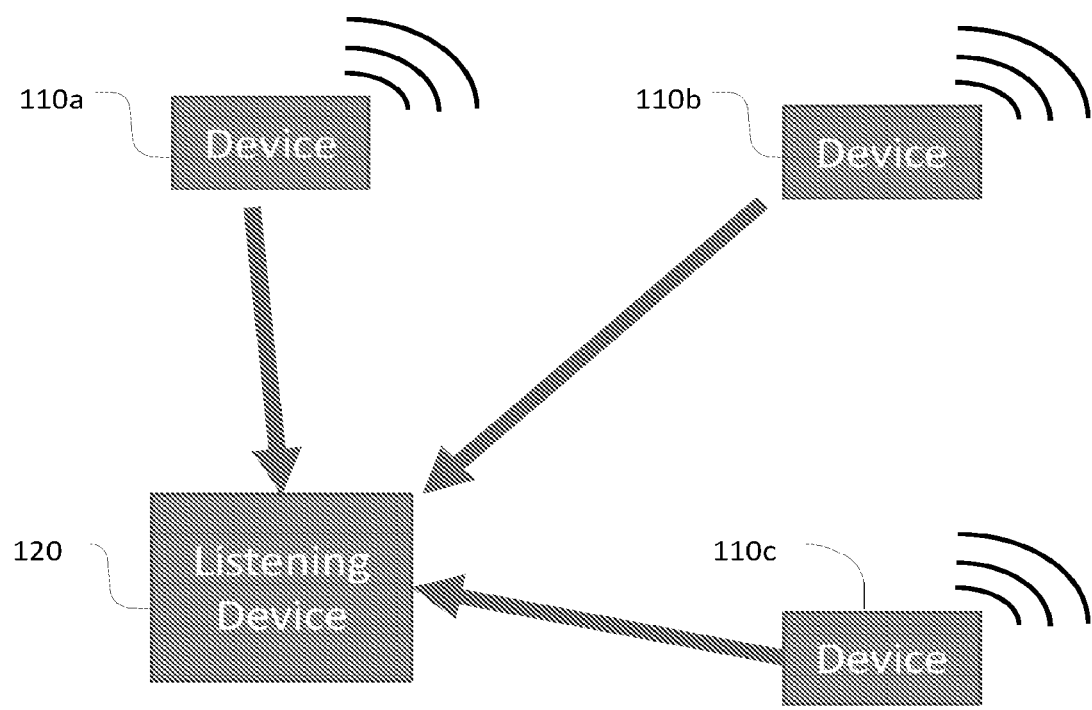
FIG. 1 is a system diagram of an example wireless environment, in accordance with an embodiment.

In an embodiment, the RF signal strength of various devices in a defined environment may be determined. In some embodiments, a listening function may be implemented to detect or otherwise ascertain the RF signal strength of the various devices. For example, with reference to FIG. 1, a listening device 120 may be implemented. The listening device 120 may be a standalone device or may be incorporated into or form part of another device such as a network router or access point.

The listening device 120 may be configured to detect and capture signals that are transmitted by devices 110a, 110b, and 110c that are communicating on a network using a protocol such as Zigbee, 802.11, Bluetooth, or other protocols. In typical network communications, data packets that are sent from one device to another via the network include data that indicate the strength of the RF signal. For example, in some networks the received signal strength indicator (RSSI) may be provided as a measurement of the power in an RF signal.

It would be advantageous to detect the RF signal strength using existing data that is exchanged, and without the need for a dedicated data packet that provides the RF signal strength. In this way, the listening device may be added to an existing physical space and used to provide the functions described herein, without the need to modify existing devices and networks.

The detection of the presence or change in status of one or more persons in a physical space may be determined using the detected RF signal strength data based on the principle that a change in the presence or absence of a person can change the RF signal characteristics in a physical space. The human body has RF absorption properties that can alter the strength, direction, and other properties of RF signals in the physical space.

In an embodiment, a baseline RF signature for the physical space can be determined, based on the techniques described herein. In some embodiments, monitoring the RF signal strength over time can be leveraged using machine learning or a rule-based function.

Figure 2:
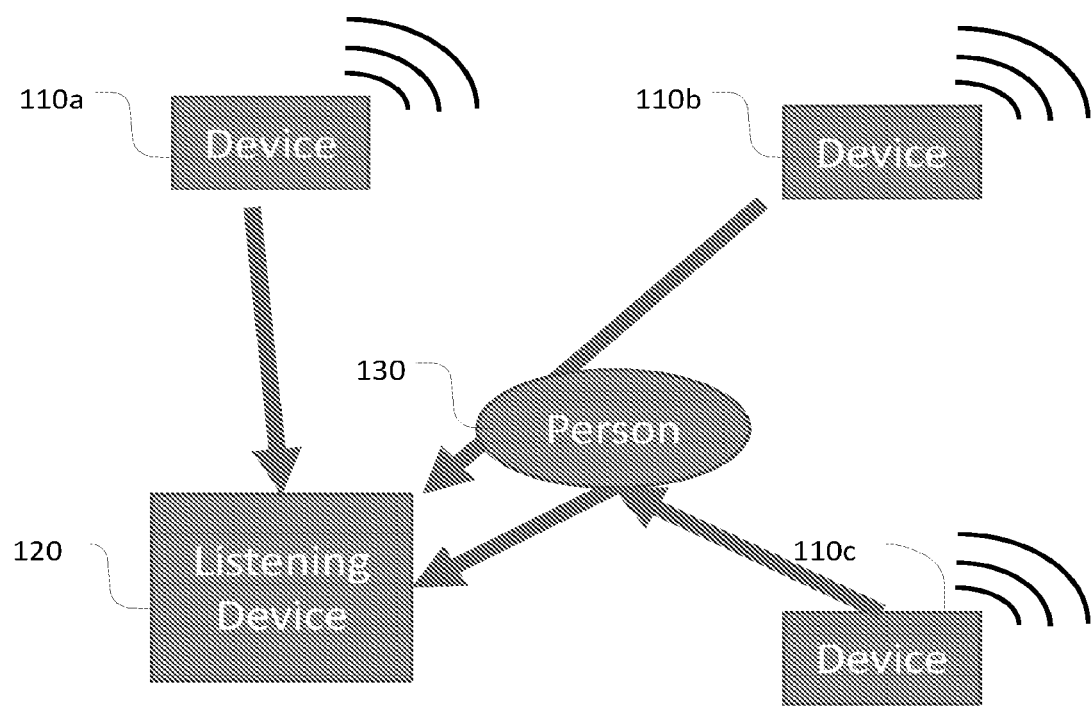
FIG. 2 is a block diagram of an example wireless environment with a person, in accordance with an embodiment.

In a static environment, such as one in which the presence or movement of humans is not in effect, and there are otherwise no changes in the physical environment, the RF strength typically does not change significantly. With reference to FIG. 2, the presence of a person 120 can alter the transmission of RF signals. The body of the person may absorb RF energy and cause signal path strengths and the paths themselves to change. Even devices that transmit infrequently may be affected by the presence of the person 120.

Although the disclosure describes embodiments where the presence of a person can alter the transmission of RF signals, the described principles can be applied to implementations where it is desired to determine the presence of other objects that absorb or reflect RF signals, such as non-human animals, inanimate objects, or any other source of matter or energy which may cause a change in the RF signal strength in a physical space.

Figure 3:
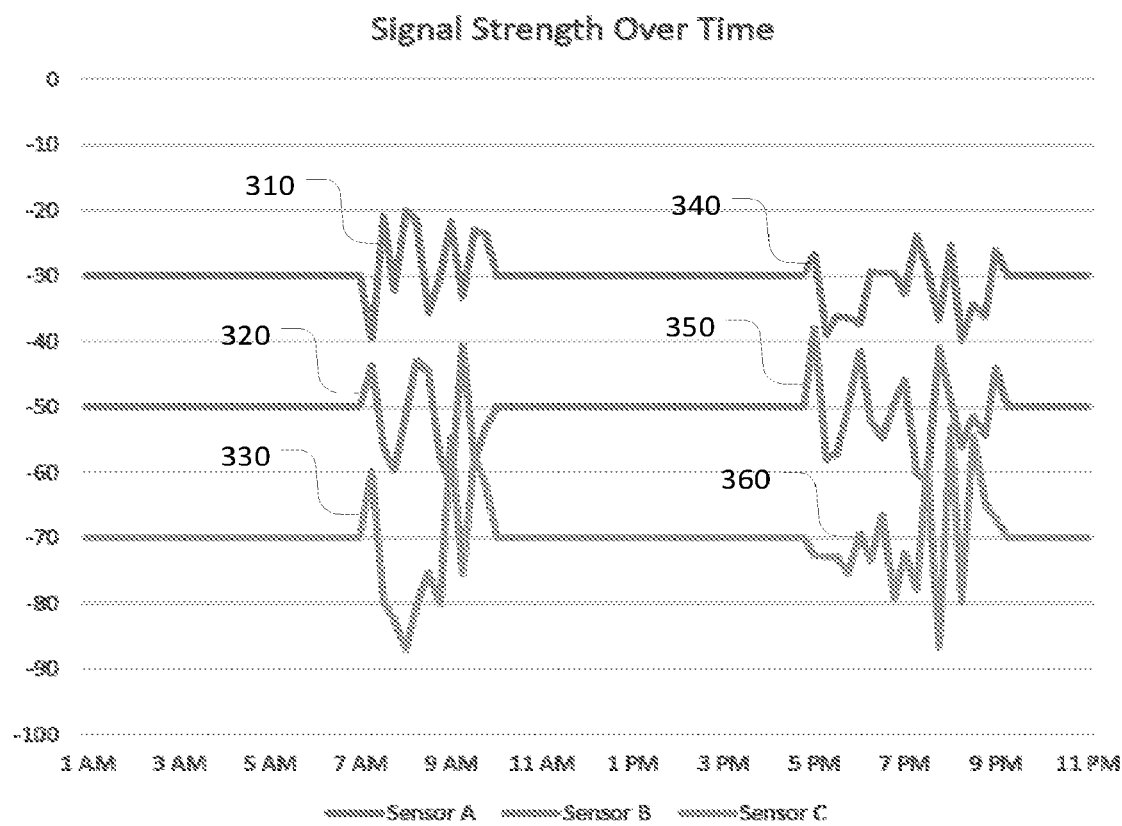
FIG. 3 is a diagram illustrating signal strength for three sensors, in accordance with an embodiment.

By using the signal strength of connected devices throughout a home or other physical space, the presence of one or more humans can be detected by determining a change in the steady stage characteristics of the RF signal strength for devices in the space. With reference to FIG. 3, it can be seen that during the period from 1 am to 7 am, the RF signal strength for sensors A, B, and C are at a steady state. However, during the period 7 AM to 10 AM, there are changes to the RF signal strength for sensors A, B, and C, as indicated by the fluctuations 310, 320, and 330. Additionally, during the period 5 PM to 10 PM, there are changes to the RF signal strength for sensors A, B, and C, as indicated by the fluctuations 340, 350, and 360. Based on these changes, it can be inferred that the presence of one or more persons in the physical environment associated with the tracked RF signal strength has caused the change in the steady state of the RF signal strength. Additionally, as shown in FIG. 3, RF signal strength for all of the three sensors indicate a change in the RF signal strength characteristics over the same time period, thus increasing the likelihood that one or more persons have entered the physical environment and remained in the environment during that time period.

Changes in the signal strength of RF signals by individual or multiple devices may change in a number of ways depending on specific types of presence and movement of persons. Furthermore, the location of the devices may also affect the RF signal strengths of the devices. Despite the possible variation in signal strength, the observation of changes to the RF signal strength for multiple devices at least during the same time period may indicate a strong likelihood of the presence of a human. Based on this finding, one or more actions may be automatically initiated. For example, an alert may be triggered if a person is not expected to be present in the physical environment during a specified time period (e.g., during the day when a home is expected to be empty), and it is determined that a person is present. Alternatively, if the presence of a person is expected during a defined time period (e.g., during the evening meal time) and it is determined that the occupant has entered the home, then other types of actions may be initiated. For example, instead of sending an alert, a home mode may be entered for a home control system, a heating element may be activated, and so forth.

In some embodiments, an unusually long period of inactivity or lack of detected presence beyond a predefined threshold may cause the triggering of an alert, such as a medical alert (e.g., in response to a possible debilitating medical condition). Alternatively, the absence of any detected presence during a normal workday may suggest that the occupants have left the premises and an away mode may be activated or a home security system may be activated.

Additionally, known locations of certain wireless devices may be used to estimate a person's location, and may be useful for informing actions that may be initiated. For example, detected human activity in a particular zone or room may be used to turn on/off lights and heating elements in those zones or rooms.

An advantage of the disclosed embodiments is that existing systems and devices that generate RF signals can provide data to detect presence of a person without the need for modifications to the devices and networks that emit the RF signals. The existing systems and devices may use existing standard protocols such as Wifi and Zigbee, and can also use proprietary protocols. Various devices that are capable of emitting RF signals may provide RF information that can be used to implement the disclosed techniques, including but not limited to devices with Wifi, Bluetooth, RFID, Zigbee, and other protocols. Additionally, if more than one protocol is used in a given area, then multiple RF data from multiple protocols can be captured and tracked, thereby increasing confidence that an observed disturbance in the RF signature is indicative of the presence of a person.

In some embodiments, a device can be added to an existing network or group of communicating devices. The added device may be configured to read and capture existing RF transmissions. Such a device may be referred to herein as a listening device. Alternatively, an existing device such as an access point or a networked device may be used to read and capture transmissions. The existing device may provide captured RF transmissions to a listening device. In some embodiments, the existing device may integrate functionality of the listening device.

Any protocol that maintains some level of consistent transmissions may be useful in practicing the disclosed embodiments. By tracking the transmissions and determining a baseline signal profile, detected changes to the baseline profile may be used to determine presence of one or more persons. Furthermore, a lack of change to the baseline profile may be used to determine that either that there is no movement of a person, or that there are no persons present.

The changes to the baseline profile may include any type of fluctuations, either positive or negative, which indicate a threshold amount of changes to the baseline profile. Disturbances to signal transmissions can include signal loss due to absorption or scattering, or in some cases signal gain due to signal bouncing that may result in more of the intended signal reaching the destination. In one embodiment, changes in the amplitude of the signal strength may be tracked over time, and the cumulative sum of the absolute value of the changes over a given time period may be used to determine the presence of a person. For example, the definite integral of the absolute value of the amplitude of the RF signal strength may be calculated for a predetermined time period may be calculated. If the value exceeds a minimum threshold, then a determination may be made that the changes in the RF signal strength indicate the presence of a person.

Additionally, any type of wireless communications, whether in the context of a centralized network or mesh network, may be used to implement the disclosed embodiments. The existing protocols can be used without modification. The data transmissions can be passively read and captured. Alternatively, an additional capability or layer may be added to the existing protocol. The additional layer may be a management layer that can be used to transmit and receive signal strength information as well as control messages.

In some embodiments, the determination of presence or absence of a person based on tracking of RF signals may be performed locally. For example, the device that is tracking RF signals, such as the listening device, may include a function that establishes a baseline signal profile and determines when the baseline has changed sufficiently to infer the presence of a person. Alternatively, captured RF signal data may be sent to a process in the cloud for analysis and processing of the data, and determination of when the baseline has changed sufficiently to infer the presence of a person. In some embodiments, functionality may be distributed between local and remote systems.

In some embodiments, an interface may be provided that allows an authorized user to view the tracked signal strength data, enter instructions and user preferences, and change settings.

The techniques described herein may be implemented without prescribing a specific location or layout of devices in a room or other physical environment. So long as a signal baseline can be established, changes to the signal baseline may be used to detect the presence of a person.

Figure 4:
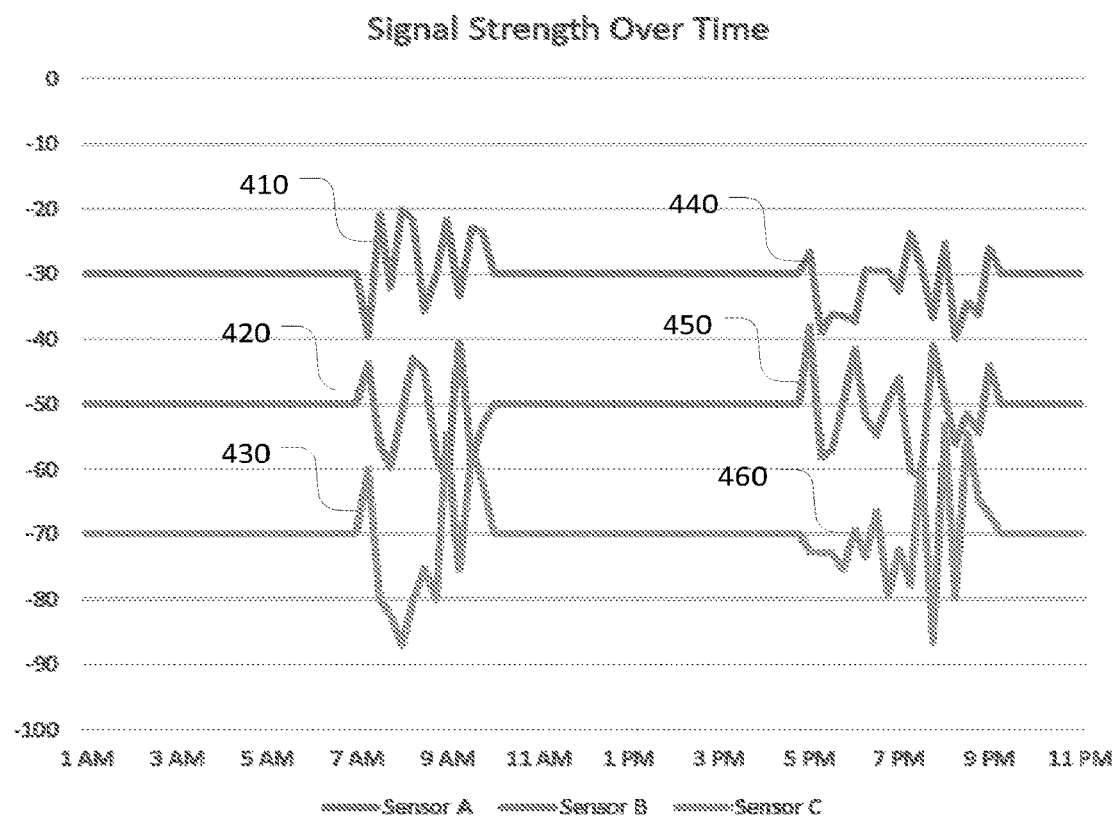
FIG. 4 is a diagram illustrating signal strength for three sensors, in accordance with an embodiment.

In an embodiment, detection of a significant change to the RF signal baseline of a location can trigger one or more actions, such as automatically setting one or more systems to a home mode or an away mode. With reference to FIG. 4, illustrated is an example of tracking signal strength, over time, for three sensors: Sensor A, Sensor B, and Sensor C. In this figure, during the time period from 1 AM to 7 AM there is no significant change to the signal strength, and this time period is designated as Night. During the time period from 7 AM to 9 AM, the baseline signal strength is undergoing significant changes, as indicated by the fluctuations 410, 420, and 430, and this time period may be designated as Home. During the time period from 9 AM to 5 PM, there is no significant change to the signal strength, and this time period may be designated as Away. During the time period from 5 PM to 9 PM, the baseline signal strength is undergoing significant changes, as indicated by the fluctuations 440, 450, and 460, and this time period may be designated as Home. Finally, after 9 PM, there is no significant change to the signal strength, and this time period may be designated as Night. In the example, settings for some home systems such as HVAC or lighting may be automatically set based on whether the time period is designated as Home, Away, or Night. For example, logic can be implemented so that one or more home systems are set to Away if no motion is detected during the day (e.g., during the time period 7 AM to 5 PM). Additionally, logic can be implemented so that one or more home systems are set to Night if no motion is detected during the night (e.g., during the time period 9 PM to 6 AM).

Figure 5:
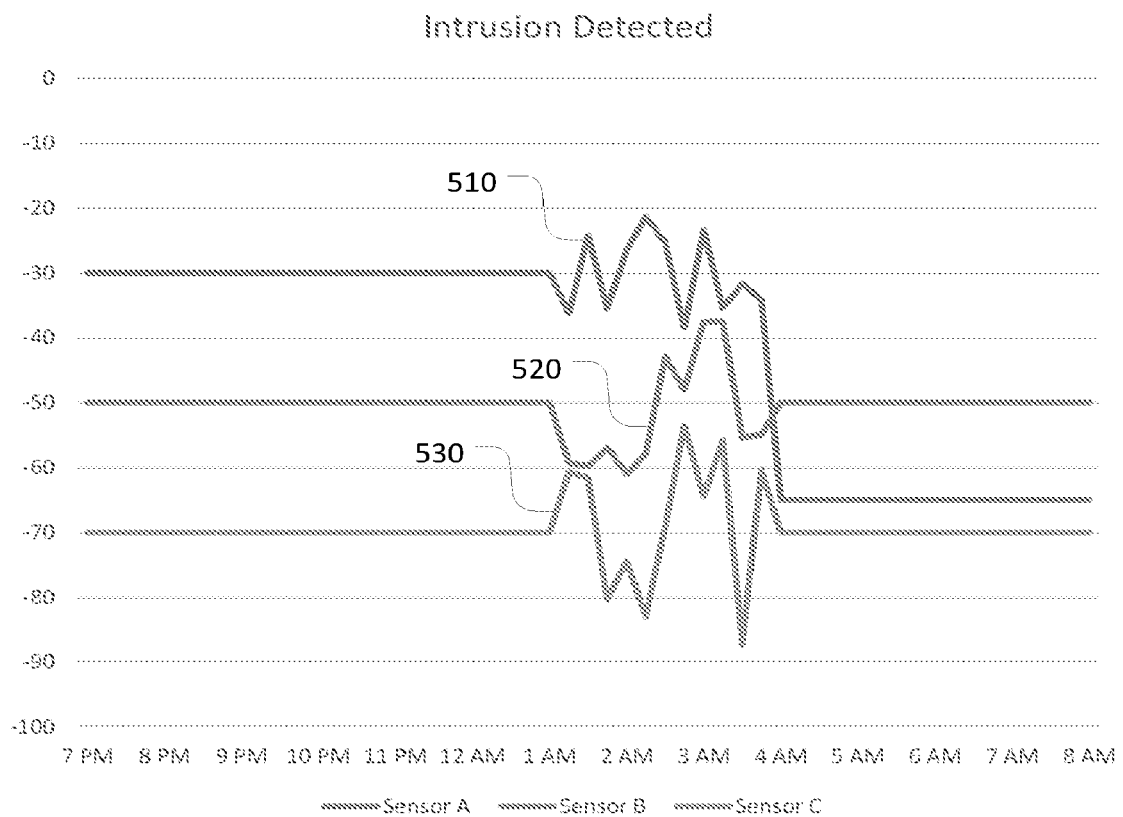
FIG. 5 is a diagram illustrating signal strength for three sensors, in accordance with an embodiment.

In an embodiment, the detected presence of a significant change to the RF signal baseline can be used to trigger one or more actions to automatically respond to a determination that an undesired intrusion has occurred. With reference to FIG. 5, illustrated is an example of tracking signal strength, over time, for three sensors: Sensor A, Sensor B, and Sensor C. In this figure, during the time period from 7 PM to 1 AM there is no significant change to the signal strength, and there are no warnings or alerts generated during this time period. During the time period from 1 AM to 4 AM, the baseline signal strength is undergoing significant changes, as indicated by the fluctuations 510, 520, and 530, and based on the assumption that this time period is normally designated as Night, an intrusion is determined and one or more automatic actions may be initiated in response, such as sending an alert to the home security system or sending a text message to an identified recipient.

Additionally, a higher fidelity system can be activated to more accurately determine the location of individuals, capture images, and the like. In some embodiments, additional information may be provided such as the general location of the detected intrusion (e.g., a room or a floor) which may be ascertainable based on the known location of the sensors. Additional settings may also be provided as to time periods and dates during which the presence of a person is not expected.

The changes in the baseline signal strength may be caused not only by the entry of a person, but may also be caused by a structural change such as an open door or a broken window, or movement of a device. Referring again to FIG. 5, after 4 AM, the baseline RF signal strength for Sensor A has changed from −30 to −65. Based on this significant change in the steady state for Sensor A, it may be inferred that the sensor has moved, or that a door has been opened or a window has been broken.

Figure 6:
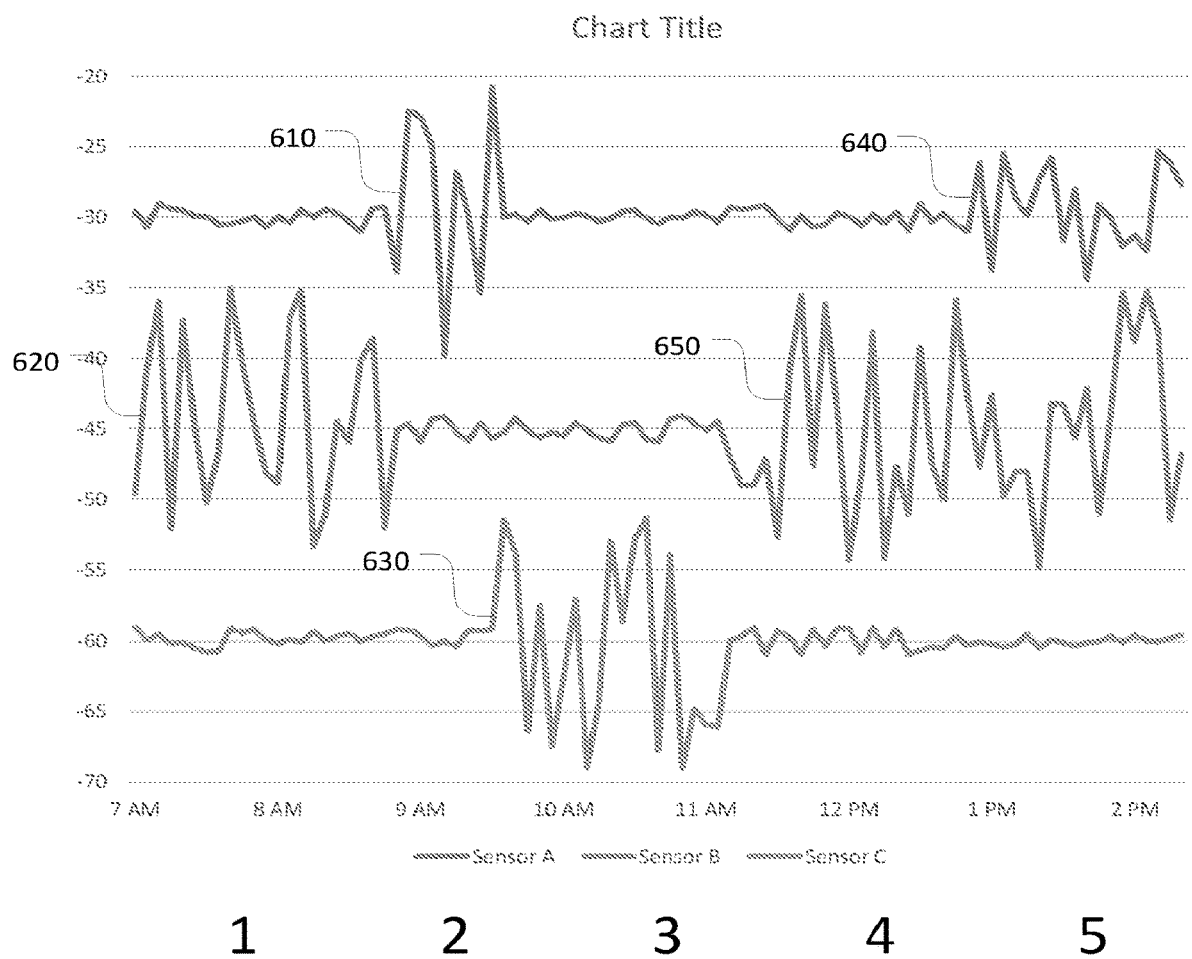
FIG. 6 is a diagram illustrating signal strength for three sensors, in accordance with an embodiment.

In an embodiment, the RF signal baseline and changes to the baseline over time can be used to estimate an approximate location where the presence of a person is detected. With reference to FIG. 6, illustrated is an example of tracking signal strength, over time, for three sensors: Sensor A, Sensor B, and Sensor C. In this figure, the baseline signal strength for each sensor is undergoing significant changes at various time periods, as indicated by the fluctuations 610, 620, 630, 640, and 650. By analyzing the change in signal strength at each sensor, an estimation of location may be determined. In one embodiment, if person is located between a sensor and the listening device, the signal may vary more because of the interference caused by the person's body being in the line of sight between the sensor and the listening device. On the other hand, devices that are not close to the person may not experience interference.

Figure 7:
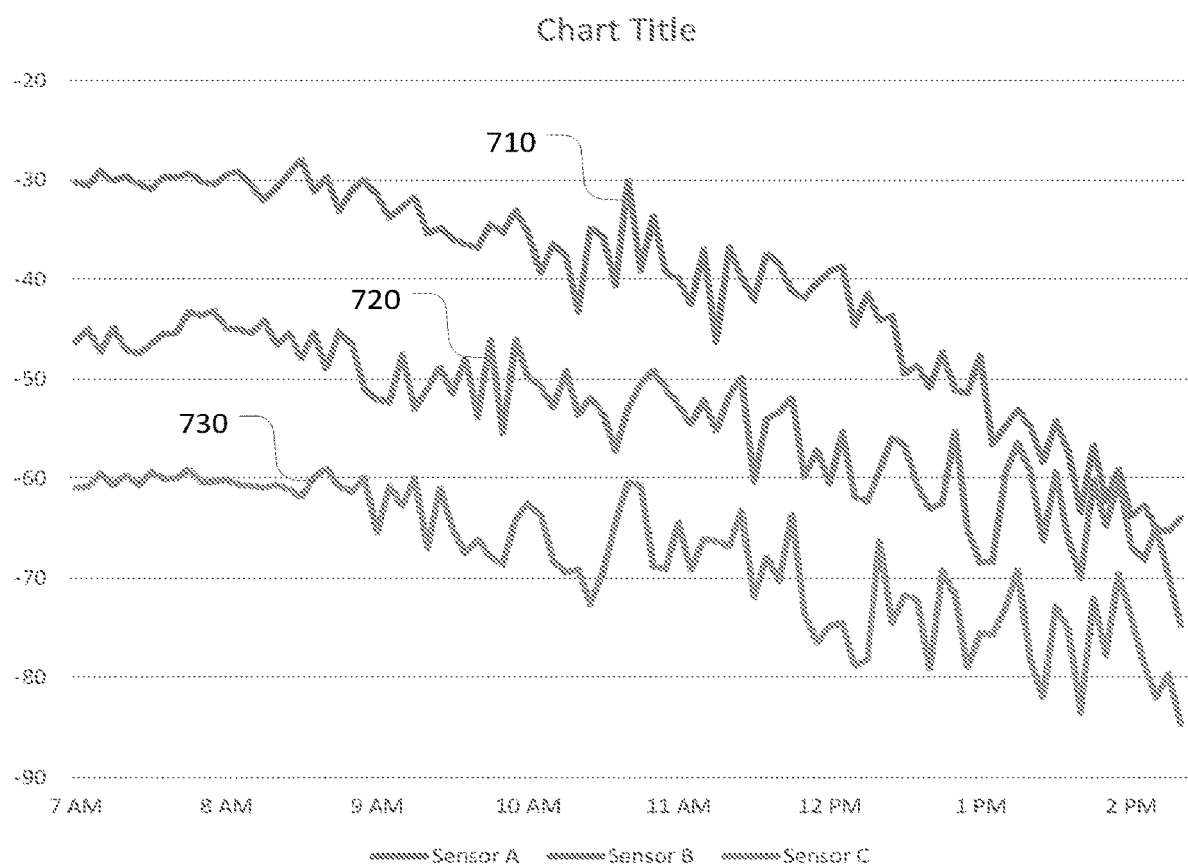
FIG. 7 is a diagram illustrating signal strength for three sensors, in accordance with an embodiment.

In an embodiment, the RF signal baseline and changes to the baseline over time can be used to estimate the number of people in an area. With reference to FIG. 7, illustrated is an example of tracking signal strength, over time, for three sensors: Sensor A, Sensor B, and Sensor C. In this figure, the baseline signal strength for each sensor is undergoing significant changes on a continuous basis and is continuously decreasing, as indicated by the fluctuations 710, 720, and 730. By analyzing the change in signal strength at each sensor over time, an estimate of the number of people in a location may be determined based in part on how many sensors are affected and how much each sensor is affected. In one embodiment, it may be assumed that the human body has an additive or cumulative effect on the signal transmission properties in a given space, so that a human body will cause a drop in signal power and that the presence of additional human bodies will cause a correspondingly larger drop in signal power. By aggregating signal power data across multiple sensors, an estimate of number of people present in a given space can be determined. Such as feature may be useful, for example, to estimate numbers of persons present at a retail business or to estimate numbers of people in large group events.

The described embodiments may be implemented in conjunction with any RF protocol that can uniquely identify the device that is sending and/or receiving RF data. For example, RF-based protocols may include Zigbee, Wi-Fi, Bluetooth Low Energy ("BLE"), Thread, and the like. In some embodiments, multiple protocols may be used to provide a great diversity of data. Additionally, within a given protocol, additional frequencies may be used to provide additional data. For example, signal strength data for 2.4 GHz and 5.0 Ghz may be used when using Wi-Fi.

In some embodiments, a listening device or function may send specific messages to gather signal strength data from neighboring devices. In some embodiments, the listening device or function may passively gather information during the normal course of data transmission/reception by the neighboring devices. The listening device or function may be provided in a primary hub or coordinator, part of the network, or may be a dedicated listening device.

The listening device or function may be communicatively coupled to a wireless network and configured to receive information from various computing devices, sensors, and other devices. The listening device or function may be configured to determine the presence or absence of one or more persons. The presence/absence information may be made available to other devices. For example, the presence/absence information can be displayed on a connected user interface device, or the presence/absence information can be provided to authorized devices on the local network or transmitted to devices in other locations.

The listening device or function may be configured to use inference logic to infer the presence/absence information based on the collected RF signal strength data from the computing devices, available sensors, and other devices. Sensors include devices for detecting light, movement, and sound, for example. Other devices may include IoT devices that may include lighting controllers, thermostat controllers, entertainment devices, and other devices. The RF signal strength data may also be supplemented with user device information which may include, for example, application activity, keyboard activity, touchpad activity, etc. The inference logic may execute on a device on the network such as the listening device or another device. The listening device or function may be implemented on one or more devices of an interconnected network such as an Internet of Things (IoT) network.

The listening device or function may be configured to determine or infer a most likely or most probable status with respect to the presence or absence of one or more users. In some embodiments, the probable status may be determined based on a confidence factor.

The listening device or function may further be in communication with devices that may be used to publish, render, or otherwise make known the presence/absence status. For example, an LCD display may be provided to display a visual representation of the presence/absence status. The display device may be situated in another location where such information may be of interest to other users.

The presence/absence information may be subject to user preferences for how and when to determine this information. The presence/absence information may also be subject to various rules and regulations pertaining to privacy, security, and other factors.

The listening device or function may include various levels of complexity based on the available sensor and device information. The listening device or function may maintain the user's presence information and update the presence continuously or as new information is becomes available. The presence/absence information may be persisted and made available to requesting systems or published to various destinations.

In some embodiments, the listening device or function may be configured with a default set of parameters for when the user presence detection is allowed. Such parameters may include a time period where the user presence detection and responses are to be in effect. In some embodiments, the user may be provided the ability to select options for the user presence parameters. For example, the user may specify a radius or geo-fence in which the user's presence may be detected.

In another example, the user may select an option to turn off the listening device or function completely, for example if the user's location will have numerous occupants and the automated responses are not desired. In some embodiments, enablement of user presence detection features may be limited to time periods and/or locations based on a profile configured by the user.

In some embodiments, the determined presence of a person may have an associated uncertainty, and the determined presence may be assigned a score or metric. The score or metric may quantify a likelihood that the determined or location state represents the actual presence of the person.

In an embodiment, the determination of the user's presence may be determined using an inferred or deduced set of conditions and a set of rules. In one embodiment, a set of conditions may be used to determine an estimated presence state of a user. In response, the set of conditions as well as other information may be collected and analyzed to determine that presence state and whether actions should be initiated based on the state. One or more rules can be used to make either or both determinations.

In some embodiments, the user presence detection function may be configured to adapt to the specific behavior patterns of the user. For example, if it is observed that the presence of the user has not been detected during the same time period on a daily basis for several weeks, the user presence detection function may require a stronger or weaker indication of presence in order to determine the presence state of a user. In some embodiments, the user presence detection function may be configured to modify conditions and rules for determining the presence of a user based on feedback using aspects of machine learning, thus allowing for the determinations and actions to be improved over time.

Figure 8:
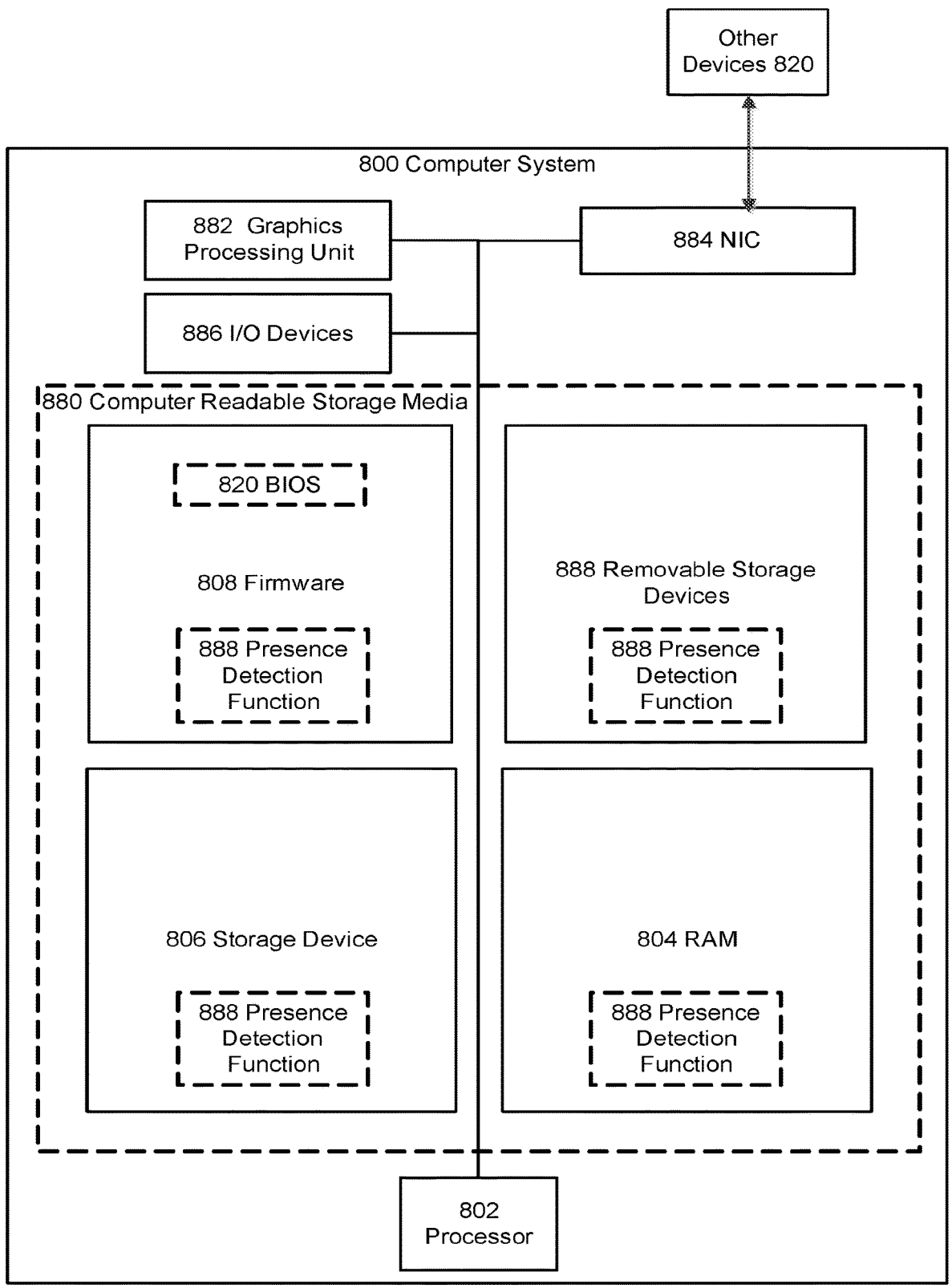
FIG. 8 is a system diagram of an example system including a presence detection function, in accordance with an embodiment.

Referring to FIG. 8, an example computing environment in which embodiments of the present disclosure may be implemented is depicted and generally referenced as computing system 800. As utilized herein, the phrase "computing system" generally refers to a computing device with processing power and storage memory, which supports operating software that underlies the execution of software, applications, and computer programs thereon.

As shown by FIG. 8, computing system 800 includes processor 802 (e.g., an execution core) that is interconnected by one or more system buses that couple various system components to processor 802. While one processor 802 is shown in the example depicted by FIG. 8, one skilled in the art will recognize that computing system 800 may have multiple processors (e.g., multiple execution cores per processor substrate and/or multiple processor substrates each having multiple execution cores) that each receive computer-readable instructions and process them accordingly. The one or more system buses may be any of several types of bus structures including a memory bus or memory controller, a peripheral bus, and a local bus using any of a variety of bus architectures. In an embodiment, computing system 800 also includes a host adapter, Small Computer System Interface (SCSI) bus, and an external storage device connected to the SCSI bus.

Computing system 800 also typically includes or has access to various computer-readable media. Computer-readable media is any available media accessible to computing system 800 that embodies computer-readable, processor-executable instructions. By way of example, and not limitation, computer-readable media includes computer-readable storage media 880 and communication media. Aspects of the present disclosure are implemented by way of computer-readable, processor-executable instructions that are stored on or transmitted across some form of computer-readable media.

Communication media typically embodies computer-readable instructions, data structures, or program modules. Computer-readable storage media 880 can include, for example, random access memory ("RAM") 804; storage device 806 (e.g., electromechanical hard drive, solid state hard drive, etc.); firmware 808 (e.g., FLASH RAM or ROM); and removable storage devices 888 (e.g. CD-ROMs, floppy disks, DVDs, FLASH drives, external storage devices, etc). It should be appreciated by those skilled in the art that other types of computer-readable storage media can be used such as magnetic cassettes, flash memory cards, and/or digital video disks. Generally, such computer-readable storage media can be used in some embodiments to store processor executable instructions tangibly embodying aspects of the present disclosure. Consequently, computer-readable storage media explicitly excludes signals per se.

Computer-readable storage media 880 can provide non-volatile and/or volatile storage of computer-readable, processor-executable instructions, data structures, program modules and other data for computing system 800. A basic input/output system ('BIOS") 820, containing the basic routines that help to transfer information between elements within computing system 800, such as during start up, can be stored in firmware 808. A number of programs may be stored on firmware 808, storage device 806, RAM 804, and/or removable storage devices 888. These programs can include an operating system and/or application programs. In a specific embodiment, computer-readable storage media 880 of a computing system 800 can store presence detection function 888, which is described in more detail throughout this disclosure. In this example embodiment, presence detection function 888 can be executed by processor 802 thereby transforming computing system 800 into a computer environment configured for a specific purpose, i.e., a computer environment configured according to techniques described in this disclosure.

With continued reference to FIG. 8, commands and information may be received by computing system 800 through input/output devices ("I/O devices") 886. I/O devices 886 include one or more input devices, output devices, or a combination thereof. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 802 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit.

Computing system 800 may operate in a networked environment and receive commands and information from one or more remote computers via logical connections to the one or more remote computers, such as a remote computer. The remote computer may be another computer, a server, a router, a network PC, a peer device or other common network node, and typically can include many or all of the elements described above relative to computing system 800.

When used in a LAN or WAN networking environment, computing system 800 can be connected to the LAN or WAN through network interface card ("NIC") 884. NIC 884, which may be internal or external, can be connected to the system bus. In a networked environment, program modules depicted relative to computing system 800, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

In a networked environment, program modules depicted relative to computing system 800, or portions thereof, may be stored in a remote memory storage device accessible via NIC 884. It will be appreciated that the network connections shown are exemplary and other means of establishing a communications link between the computers may be used. FIG. 8 also shows other devices 820 which may include sensors and other devices that may provide data from which the presence of a user may be determined.

Figure 9:
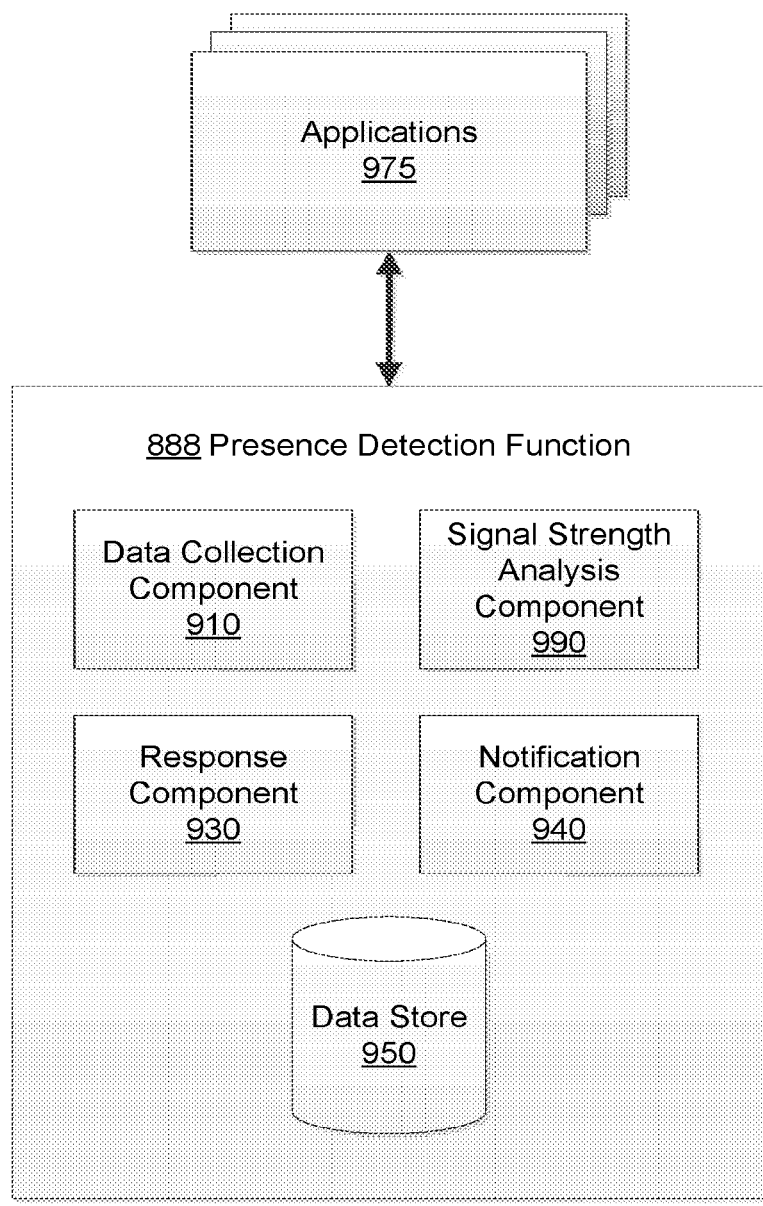
FIG. 9 is a system diagram of an example presence detection function, in accordance with an embodiment.

Turning now to FIG. 9 is a block diagram illustrating an example presence detection function 888 suitable for implementing human presence determinations, in accordance with one or more embodiments. Presence detection function 888 may take on any of a variety of forms. In an embodiment, presence detection function 888 may be implemented on a single computing device, by multiple computing devices, such as computing system 900 of FIG. 9, and in some embodiments at least one server component or a computing component accessed via a network connection (e.g., a cellular network, a WiFi/broadband network, a local area network, and the like). By way of example, computer system 900 may be a mobile telephone, smart phone, laptop computing device, desktop computing device, server, tablet computer, personal digital assistant (PDA), a wearable computer, a gaming device, or any other computing device. The at least one server component may comprise a single computing device or multiple computing devices cooperating in a distributed environment. For example, the at least one server component may be provided via multiple computing devices arranged in a distributed environment that collectively provide one or more of the functionalities described herein.

As shown by FIG. 9, presence detection function 888 includes such components as data collection component 910, signal strength analysis function 990, response component 930, notifications component 940, and data store 950. Data collection component 910 may be generally responsible for receiving (acquiring, obtaining, or accessing) signals and/or data from one or more sources such as sensors and other devices. In an embodiment, the signals may be signals received by data collection component 910 and stored in one or more data stores, such as data store 950. The one or more data stores may thus be available to signal strength analysis function 990, response component 930, and notification component 940.

Signals may be received from a variety of sources. By way of example, some signals may include state data for a device, network connection data, application activity data, and the like. In an embodiment, any type of existing signal is usable as a signal as long as it increases or decreases a likelihood of determining a presence of one or more persons.

Device state data may include user interaction with the computing device, receiving tracking status events from a tracking engine, and the like.

Network connection data may include information, such as whether the computing device is paired with a Bluetooth system, wireless access point connections, variations in a number of visible wireless access points (e.g., Wifi basic service set identifiers), signal strength measurements (e.g., received signal strength indicator values) associated with visible wireless access points, and the like. Application activity data may include information, such as receiving geo-fence events for geo-fences set by other applications (e.g., applications 975), and the like.

Signals may also include derived data. As another example of a raw system signal that can be used as a signal includes: "user is active on the device". In an embodiment, some derived signals may be a strong indication that a person is present even without the presence of RF signals. As used herein, "derived data" refers to data indicative of a state of a device that is derived from other signals. For example, derived data may include position and velocity data associated with the computing device that is derived from GPS positions opportunistically obtained from unrelated applications (e.g., applications 975), system activity, and the like. By way of example, signals may include data that is actively solicited, requested, or generated specifically for system 900.

Signal strength analysis function 990 may be configured to determine scores (or metrics) for user presence based on the signals as well as other information. For example, signal strength analysis function 990 may use as input statistical information associated with the signals. Furthermore, signal strength analysis function 990 may determine scores determined for possible user states and positions. The score may indicate a likelihood that an actual presence of a user actually corresponds to the determined presence. Signal strength analysis function 990 may use the received signal strength indicator (RSSI) measurement that is available in some protocols to indicate the power present in a received RF signal. Because there may not be a specific parameter (e.g., decibels) for the RSSI or a standardized set of values, the signal strength analysis function 990 may track the relative changes in value to determine presence, in particular when tracking multiple signal sources. Other types of power indicators may be used, such as the received channel power indicator (RCPI).

In an embodiment, a score may be expressed as a percentage, discrete enumeration (e.g., low, high, or unknown), or a combination. Examples of statistical information may include any combination of confidence scores, variance metrics, central tendency values, probability distribution functions, and the like. In determining a score for a user presence, signal strength analysis function 990 may receive one or more signals as input and provide the score for a determined user presence as output. The signals may be received at any level of granularity, and may be affected by the frequency of transmissions in a particular protocol, including: continuously, periodically (e.g., every second, every minute, every ten minutes, etc.), or upon specific events.

Signal strength analysis function 990 may utilize various functions to determine scores for user presence based on signals. In an embodiment, a score may be determined by taking a weighted average of individual signals. In an embodiment, a score may be determined in part using actively obtained signals indicative of the current RF signal strength. In an embodiment, weights may be determined using training data obtained from data sets composed of previously-received signals. For example, a computing device may run in a test mode in which signals are collected along input data providing verified numbers of persons associated with the signals. That is, actual human presence data may be obtained during regular intervals to obtain a ground truth that could be correlated with the signals to generate training data. In an embodiment, a score may be determined that defines relationships between individual signals and the actual numbers of persons who are present in a defined location.

In an embodiment, artificial intelligence, machine learning, knowledge-based, or rule-based mechanisms to train machine learned models that receive signals as input and provide a score for user presence as an output. Examples of such mechanisms include support vector machines, neural networks, expert systems, Bayesian belief networks, fuzzy logic, data fusion engines, classifiers, and the like. In training the machine learned models (e.g. find optimal values of for model parameters), objective functions may be used to measure the performance of the models using a subset of the training data as a function of the model parameters. For example, optimal values of the parameters of a model may be determined by finding a minimum of the objective function.

As an example, signal strength analysis function 990 may determine a score for user presence using a logistic function. One skilled in the art will recognize that signal strength analysis function 990 may provide a score based on dozen or even hundreds of signals. Signal strength analysis function 990 in this example may provide two signals into the following "user is present" state equation to determine a score for the "user is present" state:

$$P_{present}(\text{variance,time}) = f(\text{variance,time}) \quad \text{Equation 1:}$$

In one embodiment, the variance of the amplitude of the RSSI may be tracked over a predetermined period of time. The probability that a person is present may be determined based on the accumulated variance over the time period. If the probability exceeds a predetermined threshold, then it may be determined that a person has entered the location of interest. In some embodiments, an "indeterminate" threshold may be defined that indicates there is insufficient information available to determine that a person is present. Some signals may increase the likelihood that the user is in a given state or presence (i.e., a positive correlation exists), while other signals may decrease the likelihood that the user is in a given state or presence (i.e., a negative correlation exists).

Individual signals may be weighted to reflect a signal's influence on the score relative to the other signals. Signal strength analysis function 990 may also implement a "user is absent" state equation to determine a score for the "user is absent" state. For example, the "user is absent" state equation may be as simple as:

$$P_{absent}(\text{variance,time}) = (1 - P_{present}) \quad \text{Equation 2:}$$

In some instances as in this example, the "user is present" state equation and the "user is absent" state equation may both return a low score, which indicates that the scores for the "user is present" state and "user is absent" state have each failed to exceed their respective "indeterminate" thresholds. In these instances, system 900 may be unable to determine the current state of the user. For example, this may occur in situations with limited data availability. In one embodiment, a predetermined period of time in this uncertain state, system 900 may transition to an "unknown" state.

Response component 930 may be configured to determine actions in response to the state or presence of the user as determined by signal strength analysis function 990 of system 900. Response component 930 may initiate a system action within a predefined time period. In an embodiment, the active operations may result in sending control signals to one or more systems such as an alarm, communications device, or other system. The action implemented by response component 930 may further provide notifications to one or more other devices.

In an embodiment, system 900 may be configured to limit actions to certain types, such as only allowing notification operations, or allowing actions only for a specified time period, in order to better control the responses to those that are appropriate for the circumstances or in accordance with the user's preferences.

In some embodiments, user presence determinations may have an associated uncertainty. Response component 930 may modify system actions by categorizing actions based on state scores and probabilities. For example, response component 930 may specify an action for states associated with higher state scores when there is also a higher likelihood that active operations will result in confirming the computing device is in a "present" state.

As another example, response component 930 may specify an action for states associated with specified characteristics. By doing so, response component 930 may reserve a portion of the system action to states associated with locations that are more important for the user like the user's office or the user's bedroom. As another example, response component 930 may specify an action for states associated with lower state scores when there is a lower likelihood that active operations will result in confirming the user is in a present state.

In an embodiment, response component 930 may implement a hierarchy among the potential actions based on state scores, user preferences, probabilities, or a combination thereof. Using this hierarchy, response component 930 may facilitate actions based on various confidence levels.

In an embodiment, response component 930 may be further configured to dynamically adjust actions using user state information. Examples of such current system state information include whether the user's alarm system is already activated, or whether the user's mobile device is connected.

Notification component 940 may be generally configured to provide user presence related notifications to applications executing on a specified device. In an embodiment, notification component 940 may be implemented using an application programming interface. In cooperation with signal strength analysis function 990, notification component 940 may provide other applications with notifications upon determining the user has transitioned from one state to another. For example, notification component 940 may provide such notifications when the user present state has been entered, or the user present state has been exited. The notifications may include such information as the location where the presence state has been detected, status of one or more systems that have been activated, number of persons (if determined), and the like. In an embodiment, notification component 940 may issue notifications to applications upon determining that a state score exceeds a predetermined threshold (e.g., 0.7).

Figure 10:
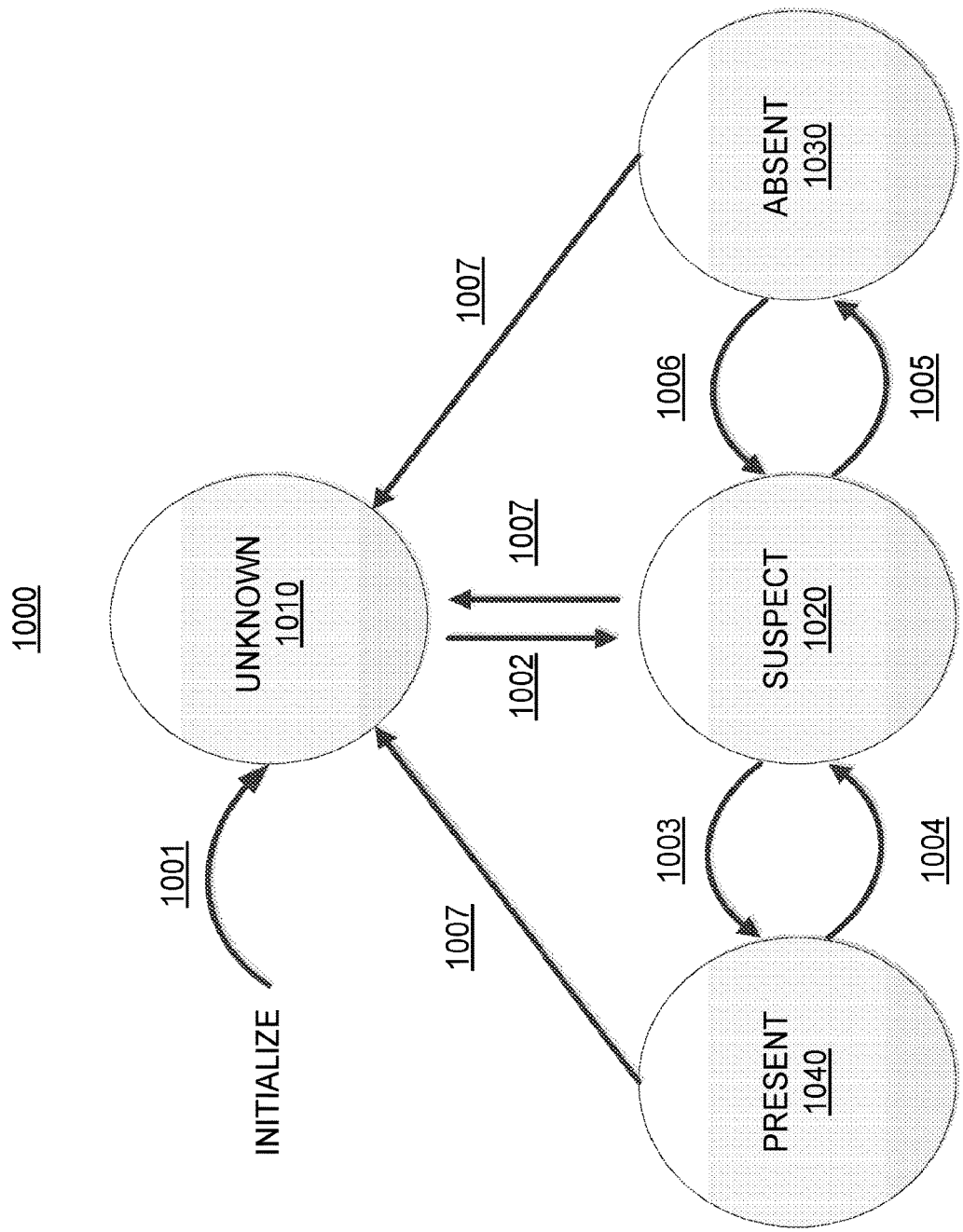
FIG. 10 is a state diagram showing modes of operation of an example presence detection function, in accordance with an embodiment.

FIG. 10 shows a state diagram with four operation modes of an example user state determination system 1000 that may be implemented. The four operation modes are an unknown mode 1010, a transition mode 1020, an absent mode 1030, and a present mode 1040. While this example illustrates four operation modes, it should be understood that FIG. 10 only illustrates one example, and that many operation modes or states may be implemented.

In the four operation modes, system 1000 may continue to monitor signals to determine the user's current state. In one embodiment, in the unknown mode 1010, system 1000 may be mostly idle and does not initiate any actions. As indicated by transition 1007, system 1000 may switch to the unknown mode 1010 from any other operation mode when it is unable to determine a current state of the user from signals. System 1000 may also operate in the unknown mode 1010 when data is unavailable. One reason that data may be unavailable is system 1000 lacks power, or is unable to access a network. When operating in the unknown mode 1010, system 1000 may periodically (e.g., "every few minutes" or when the signals start returning probability higher than "undetermined" for another state) switch to the transition mode 1020 to determine the current state, as shown by transition 1002.

In transition mode 1020, system 1000 may trigger operations to continue to monitor signal strength data, or to increase the rate at which the signal strength data is monitored. For example, if some signal variation is detected but the threshold level has not been exceeded, then system 1000 may increase the rate at which signal strength data is monitored while in transition mode 1020.

If data obtained in transition mode 1020 indicates that the user is in an absent state, system 1000 follows transition 1003 to absent mode 1030. Alternatively, if the data obtained in transition mode 1020 indicates the user is in a present state, system 1000 follows transition 1005 to present mode 1040. As discussed above, system 1000 may also follow transition 1007 to unknown mode 1010 for at least the reasons discussed above.

Figure 11:
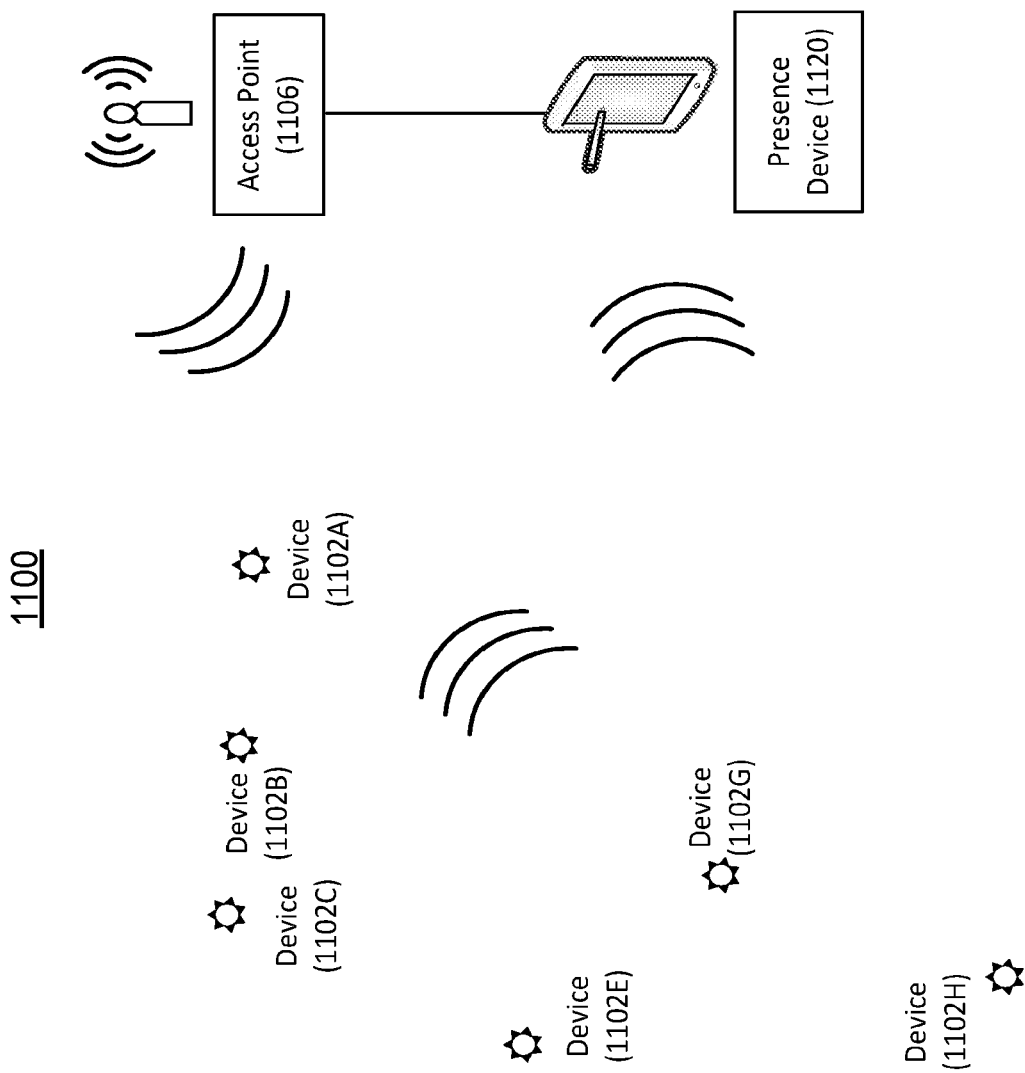
FIG. 11 is an illustration of system that may be used in various embodiments.

Turning to FIG. 11, an example of a system 1100 that includes presence detection capability is illustrated. The presence detection device 1120 may be a device that corresponds to a listening device as described herein, a presence detection device or function as also described herein, as well as other functions for determining the presence of a person based on RF signal strength data. The presence detection device 1120 may be configured to collect signal strength data as well as other data, analyze the collected data, perform one or more actions associated with the user and the user's device, and optionally send notifications to the other devices (not shown). In an embodiment, the presence detection device 1100 may be configured to access transmissions to and from a number of devices 1102A-H (which may be referred herein singularly as "device 1102" or in the plural as "devices 1102") that are in communication with access point 1106. The devices 1102 are configured to measure or otherwise obtain or transmit data indicative of signal strength to the access point 1106. The presence detection device 1120 may provide the signal strength data to the presence detection device 1120. In some embodiments, the presence detection device 1120 may be a device that is separate from access point 1106. In other embodiments, the presence detection device 1120 is part of or otherwise integrated with the access point 1106.

Each of the devices 1102 may typically be installed in various locations in or near a home, office, or other location. Although FIG. 11 shows six devices 1102 located in various positions, this number can be larger or smaller depending on the particular location and installation.

The access point 1106 and devices 1102 may be utilize any wireless technology such as Wi-Fi. However, in an example, an intermediary device can also be used. The presence detection device 1120 may be a standalone device with or without a user interface, a smartphone, a tablet, or another computing device that is capable of communicating directly with the devices 1102 or via the wireless network.

In one embodiment, the presence detection device 1120 may be configured to process the signal strength data and perform analysis to determine presence. In some embodiments, the presence detection device 1120 may not perform processing and may collect and transmit data to a device on another network or in the cloud, which may in turn execute functionality to process the received data.

In one embodiment, the presence detection device 1120 may add time and location information to the signal strength data. The presence detection device 1120 may correlate the signal strength data (e.g., the time and location stamped, labeled, and categorized data) with a particular device.

Figure 12:
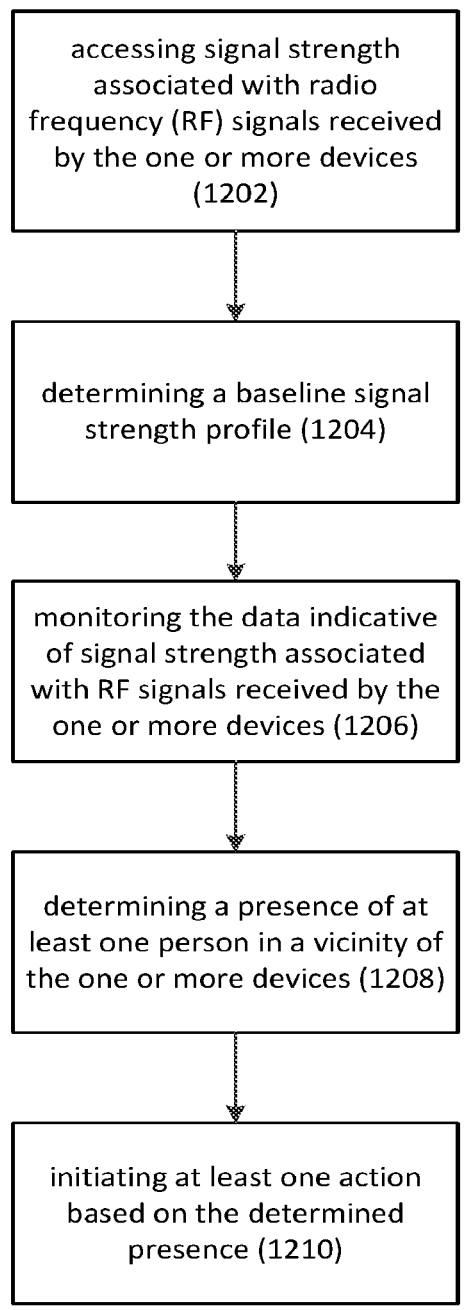
FIG. 12 is a flow diagram showing an example set of operations for determining presence status.

Turning to FIG. 12, an example operation for providing status information is illustrated. Referring to FIG. 12, operation 1202 illustrates accessing, by a computing device from one or more devices communicating via a wireless communications protocol, data indicative of signal strength associated with radio frequency (RF) signals received by the one or more devices.

Operation 1202 may be followed by operation 1204. Operation 1204 illustrates determining, by the computing device based on the data, a baseline signal strength profile.

Operation 1204 may be followed by operation 1206. Operation 1206 illustrates monitoring the data indicative of signal strength associated with RF signals received by the one or more devices.

Operation 1206 may be followed by operation 1208. Operation 1208 illustrates determining, by the computing device based on a comparison of the monitored data to the baseline signal strength profile, a presence of at least one person in a vicinity of the one or more devices.

Operation 1208 may be followed by operation 1208. Operation 1210 illustrates initiating at least one action based on the determined presence.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The terms "circuitry", "component", or "module" are used interchangeably throughout and include hardware components such as hardware interrupt controllers, hard drives, network adaptors, graphics processors, hardware based video/audio codecs, and the firmware used to operate such hardware. The terms "circuitry", "component", or "module" can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s).

In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The previous description of the aspects is provided to enable a person skilled in the art to make or use the aspects. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A system for presence detection, the system comprising:
 a computing device operable to:
  receive initial signal strength data from one or more wireless devices in a network, wherein each of the one or more wireless devices is in a location;
  establish a baseline signal strength profile based on the initial signal strength data;
  receive additional signal strength data from the one or more wireless devices in the network, wherein each of the one or more wireless devices is in the same location as when the initial signal strength data is received;
  determine a number of persons in a vicinity of the one or more wireless devices based on the additional signal strength data and the baseline signal strength profile, wherein the determined number of persons based, at least in part, on a drop in signal strength of the one or more wireless devices;
  determine a user's routine according to the number of persons in the vicinity of the one or more wireless devices over time; and
  initiate at least one action based on the determined number of persons and the user's routine.

2. The system of claim 1, wherein the one or more wireless devices communicate according to one of Wi-Fi, Bluetooth, Zigbee, 6LowPAN, Z-Wave, and Thread.

3. The system of claim 1, wherein the one or more wireless devices comprise a plurality of wireless devices, and the computing device is one of the plurality of wireless devices.

4. The system of claim 1, wherein the computing device is operable to access the additional signal strength data via an access point communicating according to a wireless communications protocol.

5. The system of claim 1, wherein the initial signal strength data comprises data indicative of radio frequency (RF) signal strength as received by the one or more wireless devices.

6. The system of claim 1, wherein the one or more wireless devices are part of an internet of things network.

7. The system of claim 1, wherein the initial signal strength data originates from at least one operation of the one or more wireless devices unrelated to determining presence.

8. The system of claim 7, wherein the number of persons is determined when the total variance exceeds a predetermined threshold.

9. The system of claim 1, wherein the determined number of persons changes is based, at least in part, on a change in signal strength.

10. The system of claim 1, wherein the at least one action comprises activating a security system.

11. The system of claim 1, wherein the at least one action comprises sounding an alarm.

12. The system of claim 1, wherein the at least one action comprises sending an electronic communication.

13. The system of claim 1, wherein the at least one action is based on a user preference.

14. The system of claim 1, wherein the computing device is operable to perform an additional action based on a change in the determined number of persons.

15. The system of claim 1, wherein the computing device is operable to terminate the at least one action based on a change in the determined number of persons.

16. The system of claim 1, wherein the computing device is operable to determine a probable location of the determined number of persons.

17. The system of claim 1, wherein the number of persons is determined during a period of time in which people are not expected to be present in the vicinity of the one or more wireless devices.

18. The system of claim 1, wherein the number of persons is determined over a predetermined time period according to a total variance in the additional signal strength data as compared to the baseline signal strength profile.

19. The system of claim 1, wherein the determined number of persons is associated with a probability.

20. A method comprising:
 receiving initial signal strength data from one or more wireless devices in a network, wherein each of the one or more wireless devices is in a location;
 establishing a baseline signal strength profile based on the initial signal strength data;
 receiving additional signal strength data from the one or more wireless devices in the network, wherein each of the one or more wireless devices is in the same location as when the initial signal strength data is received;
 determining a number of persons in a vicinity of the one or more wireless devices based on the additional signal strength data and the baseline signal strength profile, wherein the determined number of persons is based, at least in part, on a drop in signal strength of the one or more wireless devices;
 determining a user's routine according to the number of persons in the vicinity of the one or more wireless devices over time; and
 initiating at least one action based on the determined number of persons and the user's routine.

* * * * *